United States Patent
Lee et al.

(10) Patent No.: US 12,537,680 B2
(45) Date of Patent: Jan. 27, 2026

(54) SECURE CACHING OF NAMESPACE KEYS

(71) Applicant: Dropbox, Inc., San Francisco, CA (US)

(72) Inventors: Jonathan Lee, Seattle, WA (US); Stas Ilinskiy, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 226 days.

(21) Appl. No.: 17/990,218

(22) Filed: Nov. 18, 2022

(65) Prior Publication Data

US 2024/0171389 A1    May 23, 2024

(51) Int. Cl.
*H04L 9/08* (2006.01)

(52) U.S. Cl.
CPC ............ *H04L 9/0894* (2013.01); *H04L 9/083* (2013.01)

(58) Field of Classification Search
CPC .............................. H04L 9/0894; H04L 9/083
See application file for complete search history.

(56) References Cited

U.S. PATENT DOCUMENTS

| | | | |
|---|---|---|---|
| 9,674,157 B2 | 6/2017 | Ambroz et al. | |
| 9,678,893 B2 | 6/2017 | Botzum et al. | |
| 9,705,674 B2 * | 7/2017 | Roth | H04L 9/088 |
| 10,171,435 B1 | 1/2019 | Lerner | |
| 10,826,875 B1 * | 11/2020 | Kim | H04L 63/0428 |
| 11,546,156 B1 * | 1/2023 | Hendry | H04L 9/0861 |
| 2018/0069699 A1 * | 3/2018 | Bowman | H04L 9/002 |
| 2019/0149527 A1 * | 5/2019 | John | H04L 63/0442 |
| | | | 713/171 |
| 2019/0356650 A1 * | 11/2019 | Leavy | H04L 63/06 |
| 2022/0103338 A1 * | 3/2022 | Brooker | G06F 21/6218 |
| 2022/0141013 A1 * | 5/2022 | Ponnuswamy | H04L 9/0877 |
| | | | 713/193 |

(Continued)

FOREIGN PATENT DOCUMENTS

WO    2017004470 A1    1/2017

OTHER PUBLICATIONS

Gable A., "Let's Encrypt's New Root and Intermediate Certificates," Let's Encrypt, Sep. 17, 2020, Retrieved from the Internet: https://letsencrypt.org/2020/09/17/new-root-and-intermediates.html, 7 pages.

(Continued)

*Primary Examiner* — Philip J Chea
*Assistant Examiner* — Ghizlane Maazouz
(74) *Attorney, Agent, or Firm* — Keller Preece PLLC

(57) ABSTRACT

A system, method, and computer readable medium is disclosed for accessing an object that is encrypted within at least a tertiary-level encryption key scheme. This includes receiving a request to access blocks making up an object by content management system and using a top-level encryption key from a key management service, a namespace encryption key from a namespace encryption key database, and a respective block encryption keys protecting the blocks making up the object. Furthermore, the system can rely on ephemeral keys to encrypt the namespace encryption keys, so that namespace encryption keys can be stored at the content management system. Using these keys, the system can decrypt the namespace encryption key using the ephemeral key, decrypt the block encryption keys using the namespace encryption key and decrypt the blocks using the block encryption keys, thereby providing access to the object.

20 Claims, 6 Drawing Sheets

(56) References Cited

U.S. PATENT DOCUMENTS

| | | | | |
|---|---|---|---|---|
| 2022/0312195 | A1* | 9/2022 | Schnabel | H04W 12/30 |
| 2022/0377061 | A1* | 11/2022 | Raghunath | G06F 21/45 |
| 2022/0391517 | A1* | 12/2022 | Benson | G06F 21/602 |
| 2023/0044442 | A1* | 2/2023 | Choi | H04L 9/0825 |
| 2023/0246845 | A1* | 8/2023 | Peddada | H04L 9/0894 |
| | | | | 713/176 |
| 2023/0291548 | A1* | 9/2023 | Mastenbrook | H04L 9/0825 |
| 2024/0072995 | A1* | 2/2024 | Tsirkin | G06F 13/4027 |
| 2024/0113865 | A1* | 4/2024 | Noce | H04L 9/3066 |
| 2024/0403456 | A1* | 12/2024 | Shearer | G06F 21/35 |

OTHER PUBLICATIONS

Reselman B., "Understanding the Essentials of Using an Ephemeral Key Under TLS 1.3," The Linux Foundation Training &Certification, Oct. 15, 2021, 12 pages.

\* cited by examiner

SECURE CACHING OF NAMESPACE KEYS

BACKGROUND

Cloud storage systems allow users to store and access data in the cloud. Some cloud storage systems allow users to share data with other users and collaboratively access the data. In some cases, users may also store and access local copies of the data on their client devices. The local copies of the data may provide users with faster access to the data. Additionally, the local copies can allow the users to access the data when the users are offline. Cloud storage systems may also allow users to synchronize their local copies of the data with the data on the cloud to ensure consistency. For example, a cloud storage system may synchronize copies of data across several client devices and servers so each copy of data is identical. However, synchronization of data across multiple devices can be an extremely difficult task, often resulting in data inconsistencies, undesirable effects, and even loss of data.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
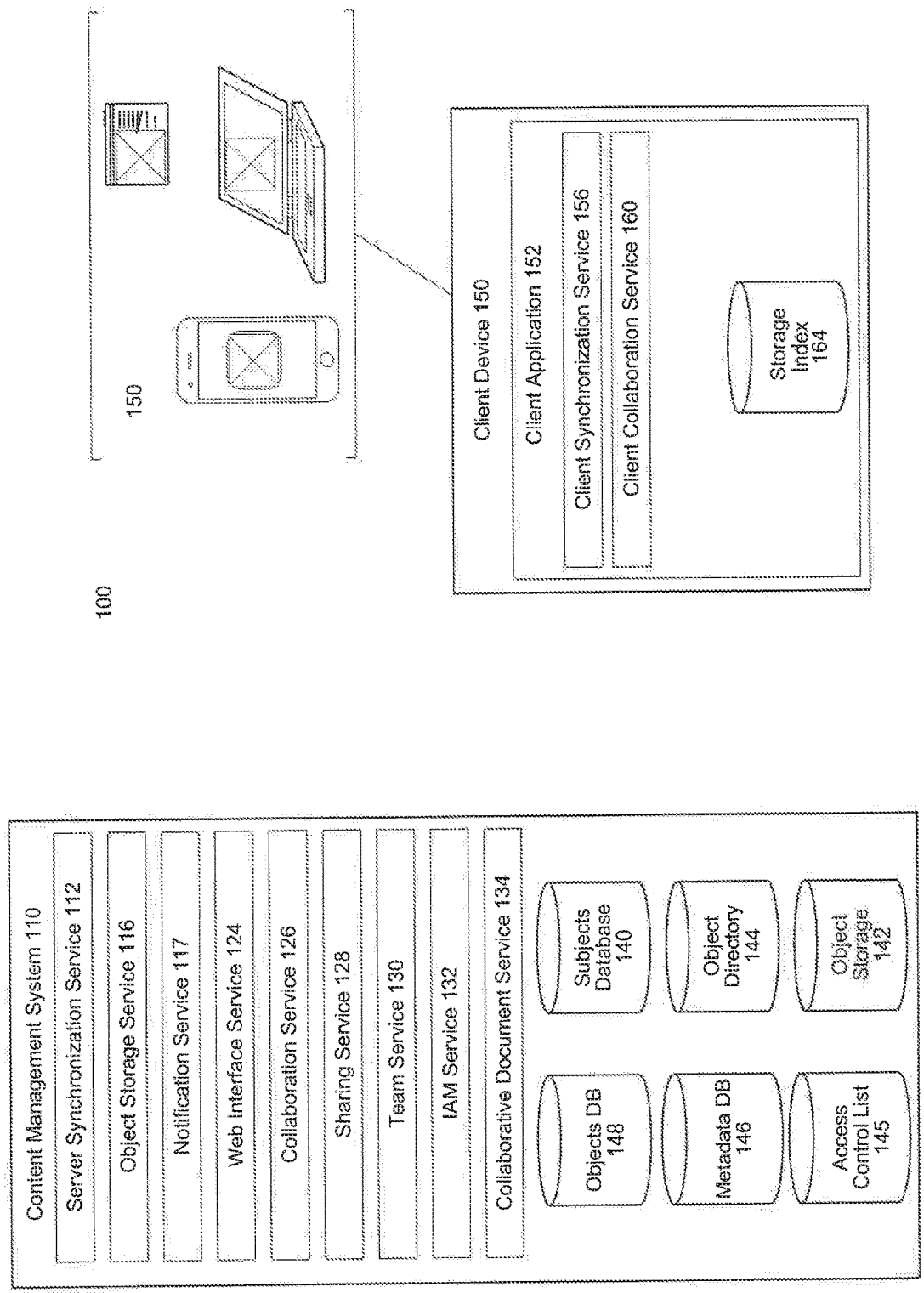
FIG. 1 illustrates an example of a content management system and client devices in accordance with some aspects of the present technology.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and descriptions are not intended to be restrictive.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Cloud storage systems allow users to store and access objects across multiple devices. The objects may include, but are not limited to, files, documents, messages (e.g., email messages, text messages, comments, notifications, etc.), media files (e.g., images, videos, audio files, etc.), folders, and/or any other unit and/or type of digital content or data. Objects may be shared with multiple users who can interact with the shared objects and/or collaborate with each other through the shared objects. Moreover, users can perform one or more object operations such as, for example and without limitation, adding/storing an object, modifying an object, deleting an object, renaming an object, moving an object, sharing an object, copying an object, viewing an object, mounting an object (e.g., a share or namespace), partitioning an object, encrypting an object, etc.

However, when storing the objects, several methods can be used to protect those objects, including using encryption. For example, currently, a system can use an encryption scheme based on having a key for each individual block being stored. To ensure the security of the blocks at rest, they can each be encrypted with a random unique block encryption key (BEK). The objects and block encryption keys stored can be encrypted with any standard encryption, including AES-256 with the standard common cryptographic libraries to implement encryption and random key generation.

BEKs can be generated by the storage system at block write time using standard cryptographic libraries to generate 256-bit cryptographically random symmetric keys. BEKs can be encrypted with high level encryption, e.g., NEKs discussed below, by the storage system using standard cryptographic libraries, specifically using AES-256. Due to the scale of the cardinality of blocks, these encrypted BEKs are persisted within storage alongside the encrypted data for each block with the same storage device characteristics.

When an object is uploaded to a content management system, the system can break the object down into several blocks, each on the order of single-digit megabytes in size. The content management system can then index the encryption keys for each block by the namespace to which the block belongs and the hash value of the plaintext content of the block. This allows the content management system to operate as a Content-Addressable Storage (CAS) system, with individual encrypted object blocks to be retrieved based on the hash value of the block. Prior to storing the block, the plaintext of each block is encrypted with a unique block encryption key that is randomly generated at write time by the content management system. The unique block encryption keys can be generated randomly irrespective of the block contents or namespace associations.

Encrypting at the block level allows the system to provide security and protects the underlying data from being compromised. However, if the system were to be compromised in any way, recovery to a non-compromised system is imperative and yet costly and time consuming. Each block itself would need to be decrypted to remove the compromised encryption key, and then encrypted with the new key that is not compromised.

These block encryption keys can be protected via a global security key at the point of storage. However, implementing a storage system with only a single global security key, while better protected, can still be compromised and does not address the shortcomings of block-level only encryption. If the global key becomes compromised, the block keys are still vulnerable to exploitation, and the underlying cycle of having to provide new encryption to each of the blocks remains.

A challenge related to top-level keys (TEKs) is that these keys are generally generated and stored inside a Key Management Service (KMS). Often these KMSs are third-party services that utilize FIPS-140-2 validated hardware security modules (HSMs) to protect key material. One example of a key management service that can be utilized is Amazon Web Services Key Management Service (AWS KMS). These KMSs are often expensive to access, and since the content management system has a large number of blocks, the content management system would need to access the KMSs often. Not only is the access costly, but it is undesirable to be frequently sending the top-level key over network connections to be used by the content management system.

Another challenge related to the encryption of objects pertains to when objects need to be shared or moved. One consequence of encrypting blocks making up objects where the decryption keys for the blocks are secured by top-level keys (or team-level keys) is that sharing or moving objects with people or locations outside of the team is often slow. This is because the system can't share the top-level key that is needed to decrypt the block-level decryption key without making all of the data under the top-level key vulnerable. The system must decrypt the blocks before they are shared. If a large object or a large number of objects are transferred this process can cause considerable delay.

Embodiments presented in this disclosure offer various advantages and solutions to the above shortcomings and disadvantages described above. For example, as a solution, block encryption keys, at rest can be encrypted using namespace encryption keys (NEKs). NEKs themselves are encrypted with a top-level encryption key (TEK). TEKs can be generated and stored inside the Key Management Service (KMS) as introduced above. NEKs can be generated as data keys by AWS KMS but stored outside of AWS KMS.

TEKs can be generated by AWS KMS as needed using AWS KMS's built-in KMS key generation API to generate 256-bit cryptographically random symmetric keys. TEKs are encrypted at generation time via the AWS KMS data key generation API, which internally uses AES-256 in Galois/Counter Mode (GCM) to encrypt the key. GCM is recommended by SP 800-38D. The encrypted TEKs are persisted within AWS KMS, inside a FIPS 140-2 validated HSM. AWS KMS allows authorized entities to use keys for decryption purposes as previously described while ensuring the unencrypted top level key never leaves the hardware security module layer during use.

The block encryption keys are protected by encrypting or wrapping each block encryption key with the NEK belonging to the object's namespace. The namespace is the smallest unbreakable unit of data ownership within the storage system, this includes the namespace having full access permissions to the objects within the namespace. By using the smallest unbreakable unit of data ownership, the intermediate key within the tertiary encryption scheme provides for a level of encryption based on ownership of the objects within the namespaces, including access permissions provided to the user account associated with the namespace. When ownership is used as the basis of the intermediate key within the tertiary encryption scheme, a user can transfer ownership, e.g., copy or share, of the object via sharing the intermediate key. The intermediate key also allows for easier solutions to compromised keys, because then only the compromised key needs to be changed to regain security within the system, rather than having to change the encryption at the block level. The namespace encryption keys are further protected by a higher layer of encryption, e.g., the TEK discussed herein.

NEKs can be generated by AWS KMS at namespace creation time and exported using the AWS KMS data key generation API, to generate 256-bit cryptographically random symmetric keys. NEKs are encrypted with corresponding TEKs, discussed below, at generation time via the AWS KMS data key generation API, which internally uses AES-256 in Galois/Counter Mode (GCM) to encrypt the key. GCM is recommended by SP 800-38D. The encrypted NEKs are persisted within storage alongside additional metadata about namespaces in a database with on-disk encryption enabled. One method of decryption is performed by sending the encrypted NEK to AWS KMS through the AWS KMS decryption API. The plaintext NEK is used to encrypt BEKs at rest as discussed herein.

The intermediate level of encryption provided by the namespace key provides advantages to the content management system, including the ability to save objects in a high performing and efficient manner. This intermediate layer also helps provide additional encryption key isolation at the specific level at which objects are copied or reparented. Accordingly, using top level encryption keys that are team based along with the namespace encryption keys for encryption the block encryption keys, creates a tertiary level key encryption scheme that solves the above problems.

More specifically, the namespace key reduces the number of calls to the KMS. Calls to the KMS are only required when the content management system needs to request a new namespace key or needs the TEK to decrypt a stored namespace key. The namespace key can be temporarily stored by the content management system in a decrypted state so that it is available to decrypt the block keys. Thus, each read or write operation from the content management system can call a namespace key storage service within the content management system instead of calling the KMS.

The namespace key also improves the speed of object sharing and has a reduced need for processing resources for object sharing. One consequence of encrypting blocks making up objects where the decryption keys are specific to a team is that sharing or moving objects with people or locations outside of the team is often slow. This is because the system can't share the top-level key that is needed to decrypt the block-level decryption key without making all of the data under the top-level key vulnerable. The system must decrypt the blocks before they are shared. If a large object or a large number of objects are transferred this process can cause considerable delay.

The present technology avoids both of the above problems by introducing the middle-level key or intermediate key—the namespace key. In the tertiary system addressed herein, the system can share the namespace key with a user(s) receiving the objects. While some objects that are not being shared might also be encrypted by the namespace key, this is often a small number of objects compared to the number of objects protected by the top-level (team key).

Namespace keys are decrypted by the key management service, this requires the use of external, third-party services, which can lead to downtime issues, a potential single point of failure, and expenses associated with third-party services. It is possible to avoid these issues associated with third-party services by temporarily storing the namespace keys locally.

One issue associated with storing them locally is the security threat from having unencrypted namespace keys stored at the content management system. One solution to this is to have ephemeral keys that are temporarily used by the content management system to encrypt the namespace keys. When the system operates this way, the namespace keys encrypted with the ephemeral key can be stored securely at the content management system, while avoiding the downsides to relying solely on a third-party service.

Using ephemeral keys to temporarily store encrypted NEKs at the content management service, allows for the substantial reduction in calls to the KMS while providing the security associated with using KMS keys. Ephemeral keys can be generated by the KMS when the content management system creates an encryption or decryption process for the tertiary level encryption scheme described herein. This allows each instance or process operating the tertiary level encryption scheme to have its own ephemeral key to encrypt NEKs that would otherwise be stored in plaintext at the content management service. These ephemeral keys are temporary, and will be cycled through regularly (e.g., hours or days).

Furthermore, because there will typically be multiple instances or processes operating the tertiary level encryption scheme, each having its own ephemeral key, each process will need access to the other ephemeral keys. This is accomplished through storing the encrypted NEKs at a distributed cache, like Memcache, along with the key identification (ID) of the ephemeral key used to encrypt the NEK. By storing the key ID along with the encrypted NEK, when any instance is asked to decrypt an NEK, the instance can check to see if it already has the ephemeral key used to encrypt the NEK, if not, that instance can request the ephemeral key from the KMS. After it receives the ephemeral key from the KMS, the process can then store the requested ephemeral key locally with the process, and therefore, there is no need to ask the KMS for that ephemeral key again when the process encounters an NEK encrypted by that ephemeral key. This drastically reduces the number of calls to the KMS, thereby reducing costs while maintaining security. In one example, when implementing the present system, by using this encryption scheme, a system that is currently making 100,000 requests a second to a KMS, would be able to reduce those requests down to hundreds of requests per day. This drastic reduction in requests allows for processing improvements, as the system is no longer required to make numerous requests of a third-party, and also because each request has a cost, these costs are proportionally reduced as well. By implementing the present system, the security associated with the KMS is maintained and performance of the system is improved, meanwhile requests are reduced from billions of requests a day to hundreds of request per day.

Finally, one advantage of the tertiary encryption key scheme described herein is that sharing or moving of an object that includes sharing the namespace key results in substantially instantaneous sharing of the object. By substantially instantaneous it is meant that the users do not perceive any delay. A sharing user shares the object and the receiving user can access the object as soon as they receive the notification, which is nearly immediate. On a more technical level, substantially instantaneous means that the objects are shared without first being decrypted. The receiving user receives access to the encrypted blocks and also receives the namespace key needed to decrypt the block keys at the time the receiving user desires to access the object. There is no delay due to any encryption/decryption operations and the blocks do not need to be copied from on location to another in the content management system. Rather the content management system records updated access permissions to the shared objects and notifies the recipients that they can access the shared objects.

A content management system in line with the current disclosure, can have embodiments deployed in the context having object synchronization capabilities and collaboration features, among others. An example system configuration of system 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system, and account details can be stored in subjects database 140. Subjects database 140 can identify a registered subject by a subject ID, and store profile information for registered subjects in association with the subject ID. In some cases, profile information for registered subjects includes a subject name and/or email address. Subjects database 140 can include account management information, such as account type (e.g., various tiers of free or paid accounts), storage space allocated, storage space used, client devices 150 having a registered content management system client application 152 resident thereon, security settings, personal configuration settings, etc. In some embodiments, some information associated with an account may not be directly stored, rather this information can be derived. For example, storage space used might be explicitly stored, or it can be calculated when needed.

In some embodiments, subjects database 140 need not store complete information associated with an account for a subject. Some portion of information associated with an account for a subject can also be stored in another database of content management system 110 such as metadata database 146, or in a database external to content management system 110.

Subjects database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subjects database 140 can be broken into a plurality of tables, indexes, and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storage/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service, for example, object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file path, and/or the relationship of objects to various accounts, collections, or groups in metadata database 146, in association with the object ID of the object.

Object storage service 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application specific space or in the cloud. Client device 150 can be any client device accessing content management system 110 via a web browser and accessing objects via a web interface. While example client device 150 is depicted in form factors such as a laptop, mobile device, or web browser, it should be understood that the descriptions thereof are not limited to devices of these example form factors. For example, a mobile device might have a local file system accessible by multiple applications resident thereon or might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but in some embodiments, client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor the directory on client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use client storage index 164 to facilitate the synchronization of at least a portion of the objects within client storage with objects associated with a subject account on content management system 110. For example, client synchronization service 156 can compare client storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update objects database 148, metadata database 146, object directory 144, object storage 142, subjects database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, client storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can add associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and optionally a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments, content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 130 can provide a common shared space for the team, private subject account folders, and access limited shared folders. Team service 130 can also provide a management interface for an administrator to manage collections and objects within team and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g., a subject account with subject rights and administrator rights) IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notification service 117 when client device 150 is accessing the object. Notification service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments, content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments, client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by client application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively, or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone client application 152, one or more application plug-ins, and/or a browser extension. However, the subject can also interact with content management system 110 via a third-party application, such as a web browser, that resides on client device 150 and is configured to communicate with content management system 110. In various implementations, the client application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third-Party Services

In some embodiments, content management system 110 can include functionality to interface with one or more third-party services such as workspace services, email services, task services, etc. In such embodiments, content management system 110 can be provided with login credentials for a subject account at the third-party service to interact with the third-party service to bring functionality or data from those third-party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
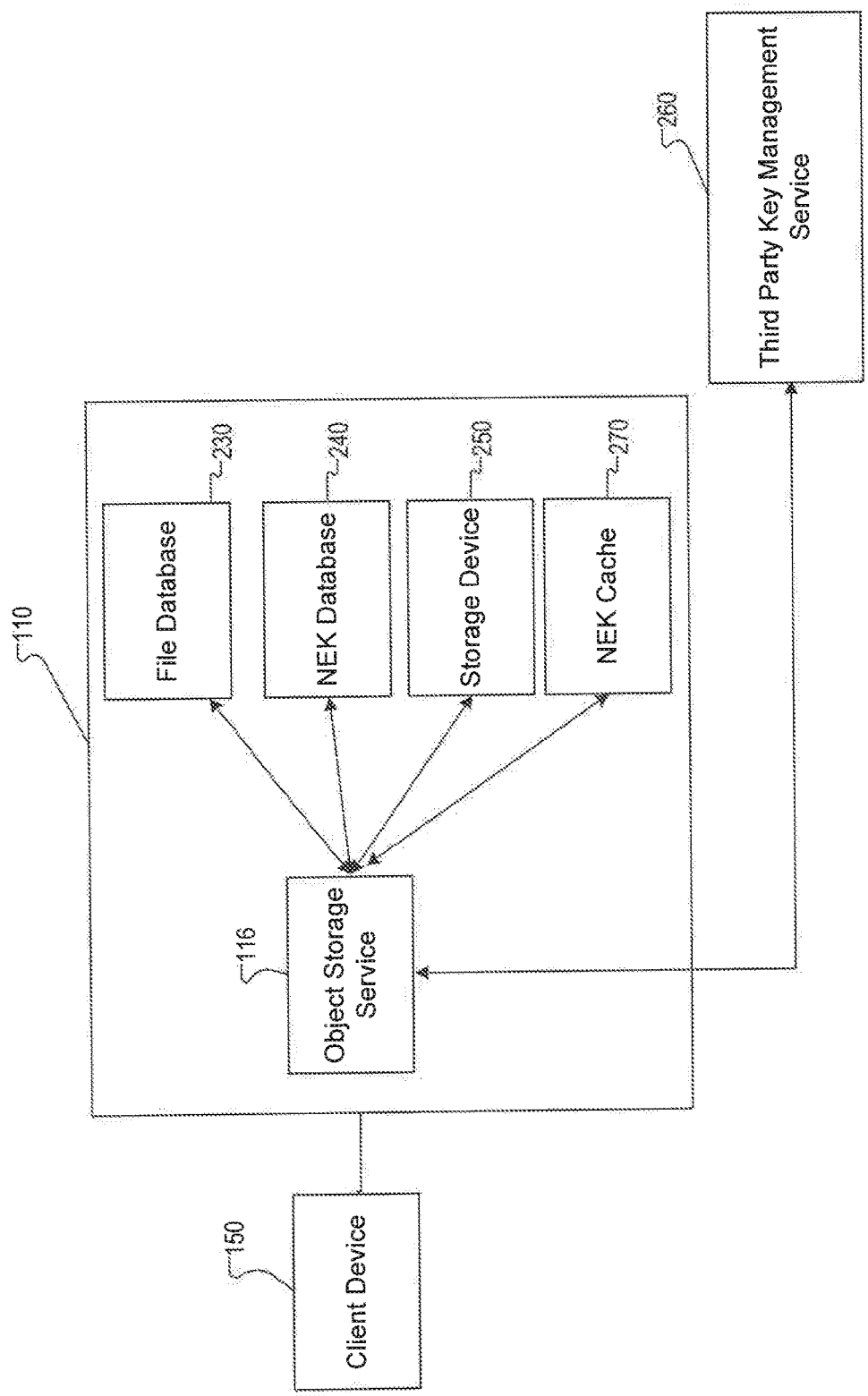
FIG. 2 illustrates an example system configuration for creating and storing a tertiary level key management scheme in accordance with some aspects of the present technology.

FIG. 2 illustrates an example system implementing a tertiary-level encryption scheme in accordance with some aspects of the present disclosure. In one example of using the system of FIG. 2, a client device 150, using an application associated with the content management system, requests an object from the content management system 110. Initially, the content management system will confirm that the user account requesting the object has appropriate permissions to access the object. When the user account has the appropriate permissions, the object storage service 116 will query the objects database 148 to retrieve the folder associated with the requested object as well as each of the blocks that makes up the object from file database 230. This query can include the credentials provided by the user account that confirm to the system that the user account has permission to access the requested object.

The objects database 148 uses the credentials provided to the object storage service 116 to verify that the user account has at least read access to the objects database 148. Once the credentials are confirmed, the object database will use the retrieved folder information to query the namespace encryption key database 240 to retrieve the associated encrypted namespace encryption key. The namespace encryption key database 240 will also verify the credentials provided to the content management system have at least read access permission for the namespace encryption key database 240. Based on the confirmation of the credentials, the namespace encryption key database 240 will provide the encrypted namespace encryption key to the object storage service 116.

When the object storage service 116 has the encrypted namespace encryption key encrypted by the third-party key management service 260, the object storage service 116 can send the provided credentials and the encrypted namespace encryption key to a third-party key management service 260 to decrypt the encrypted namespace encryption key. The third-party key management service 260 will confirm that the credentials provided by the object storage service 116 has permissions associated with the namespace encryption key, and then decrypts the encrypted namespace encryption key. After decrypting the namespace encryption key, the now plaintext namespace encryption key will be sent from the third-party key management service 260 to the object storage service 116.

Now with the plaintext namespace encryption key, the object storage service 116 will fetch the encrypted block encryption key and the encrypted data from the storage device 250. For each of the fetched blocks, the object storage service 116 uses the plaintext namespace encryption key to decrypt the encrypted block space encryption key. The decrypted block space encryption key is then used to decrypt the fetched encrypted data blocks. The object storage service 116 then combines the data from the now decrypted data blocks to create the complete unencrypted object that was requested by the user account at the client device 150, which can be stored in file database 230.

Storing the plaintext namespace encryption key at the content management system 110 results in security concerns, as storing an encryption key in plain text is no longer protected by the encryption scheme provided by the third-party key management service 260. One solution is to remove access to the plaintext encryption key and make it unavailable to the system, which makes it no longer vulnerable to being stolen or lost. However, another option is to temporarily encrypt and store the plaintext namespace encryption key at the content management system 110 in a namespace encryption key (NEK) cache 270.

In some embodiments, NEK cache 270 is a cache layer that is added between the object storage service 116 and the third-party key management service 260. The cache layer can be memory or distributed cache. Distributed cache can be Memcached distributed cache or other distributed cache solutions. The NEK cache 270 is capable of storing the locally encrypted namespace key after it is encrypted by the ephemeral key. Ephemeral keys are generated by the third-party key management service 260 on a per process basis. The ephemeral keys are then stored locally in memory for each process, thereby reducing the number of requests to the third-party key management service 260. The ephemeral keys are temporary and only last as long as the process is in use. As the system will cycle through processes regularly, each ephemeral key may only be used for hours. However, there is no requirement that the processes be terminated or cycled, which would result in ephemeral keys lasting for longer periods of time. Storing the ephemeral keys at the content management service provides an advantage by being able to decrypt NEKs without having to request the NEK from the third-party key management service 260 each time a NEK needs to be decrypted. As will be detailed below, each instance of the tertiary level encryption process has its own ephemeral key, and each process encrypts the plaintext namespace keys received from the third-party key management service 260.

Figure 3:
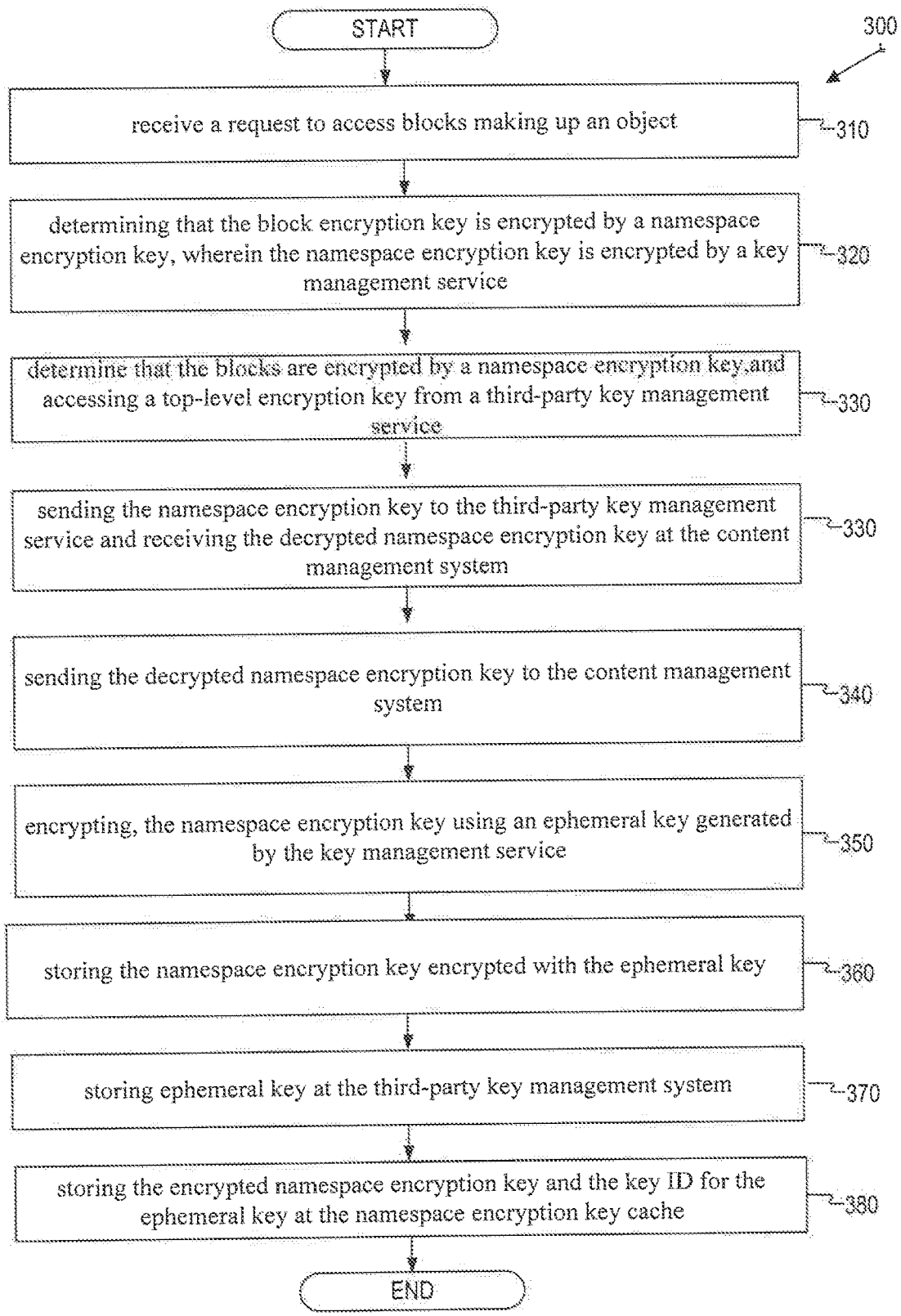
FIG. 3 is a flow chart showing an example method for accessing a namespace encryption key encrypted by an ephemeral key in accordance with some aspects of the present disclosure.

FIG. 3 is an example method 300 for implementing a tertiary-level encryption key scheme, where the block level encryption keys are encrypted using a namespace level encryption key, which is encrypted using either a third-party key management service or an ephemeral key. Although example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

While the tertiary-level encryption key scheme is provided as an exemplary encryption scheme, the current disclosure is not limited to the tertiary-level encryption scheme. For example, if there are fewer files or the system doesn't require security that is quite so robust, a single key or a two-level encryption key scheme can be used. This would allow for an exemplary system to still be protected by a key management service, but not need to consistently request keys form the KMS. For example, in a system that only used a single key from the KMS for each file, the system could reduce the requests by storing the key in cache and using the cached key to decrypt encrypted files. In this scenario, the key from the KMS can then be cycled more regularly to maintain security and overall reduce the frequency of KMS requests. Furthermore, it is possible to foresee having more than three levels to the encryption scheme and caching additional keys as needed to implement a higher order encryption scheme. The process of locally caching keys associated with KMS is not limited by the number of encryption levels present in the system.

More specifically, FIG. 3 illustrates an example of decrypting blocks making up an object when the blocks are protected using the tertiary encryption key scheme described herein.

According to some examples, the method includes receiving a request to access blocks, making up an object, by a service of a content management system at block 310. For example, the content management system 110 illustrated in FIG. 2 may receive a request to access blocks making up an object. Objects are stored in blocks no greater than 4 MB in size. Thus, an object less than 4 MB will be stored in one block, while an object of greater than 4 MB will be stored in at least two blocks.

Each of the blocks making up the object are stored at the content management system and are encrypted using block level encryption keys. Further, the block level encryption key can be encrypted with a namespace encryption key, thereby providing further security for the object. The encrypted version of block level encryption keys (encrypted with the namespace encryption key) can be stored with the encrypted blocks. The namespace encryption key, however, is not stored with the blocks, but rather is stored at the namespace encryption key database 240.

According to some examples, the method includes determining that the block encryption key is encrypted by a namespace encryption key, wherein the namespace encryption key is encrypted by a key management service at block 320. For example, the object storage service 116 illustrated in FIG. 2 may determine that the user account requesting the blocks making up the object is in possession of a namespace encryption key that is encrypted by a third-party key management service. Alternatively, in a different example, the namespace encryption key can also be encrypted and stored at the namespace encryption key database 240 of the content management system.

The encrypted version of the namespace encryption key is protected by a top-level encryption key that is stored at a third-party key management service 260 that is external to the content management system 110. While not shown in this example, it is possible for the top-level encryption key to be stored locally at the content management system 110.

The third-party key management service 260 comes with some advantages of being compliant with the stringent industry standards for key safety and special purpose hardware modules, but it is expensive to make requests of the third-party key management service 260. A compromise is to store the top-level key at the third-party key management service 260 and store the namespace encryption key at the namespace encryption key database 240 of the content management system 110. Using this scheme, fewer look ups are required by the third-party key management service 260 because it is only needed to decrypt the specific namespace encryption key required by the request.

According to some examples, when it is determined that the blocks are encrypted by a namespace encryption key, the method includes accessing a top-level encryption key from a third-party key management service at block 330 at a key management service database. When the namespace encryption key is encrypted with a top-level encryption key, the object storage service 116 illustrated in FIG. 2 may access a third-party key management service 260 to decrypt the namespace encryption key. The object storage service 116 accesses the third-party key management service 260 by, for example, sending the encrypted namespace encryption key to the third-party key management service 260, which has access to the top-level encryption key.

According to some examples, after decrypting the namespace encryption key, the third-party key management service can send the decrypted namespace encryption key to the content management system at block 340, which provides the plaintext namespace encryption key to the object storage service 116. The decrypted namespace encryption key can be stored for a limited time (e.g., throughout a session or for a time to live (TTL)) by the object storage service 116.

However, with this example of the tertiary level encryption scheme, there are still a considerable number of lookups when a content management system stores large numbers of objects. For each request related to a namespace encryption key that is stored at the content management system 110, a request to the third-party key management service 260 is needed. This can be millions of looks ups per minute for a sufficiently large content management service. One way to reduce the look ups associated with the namespace encryption key is to add a distributed cache, e.g., NEK cache 270, between the third-party key management service 260 and the object storage service 116.

According to some examples, as part of storing the namespace encryption key by the object storage service 116, the method includes encrypting, the namespace encryption key using an ephemeral key generated by the third-party key management service at block 350. For example, for each instance of the tertiary level key encryption process, the system will request the third-party key management service 260 generate an ephemeral key for that instance of the process. In an exemplary system, where hundreds of millions of namespace keys exist, the content management system 110, would typically use multiple instances of the tertiary level key encryption process to better manage hardware and software availability as well as response time to decryption requests. In the case of processing 100 million namespace encryption keys, for example, the system could operate bounded instances that include up to 1 million namespace encryption keys before starting a new instance of the process. According to this example, when an instance of the tertiary level key encryption process handles 1 million namespace encryption keys, the content management system 110 would start a new instance of the tertiary level key encryption process to accommodate the next and future namespace encryption key decryption requests utilizing the tertiary level key encryption process, such that the system would end up relying on one hundred instances that each process one million namespaces encryption key decryption processes. Furthermore, because in this example the system generates an ephemeral key for each of the one hundred instances running the tertiary level key encryption process, there would be 100 ephemeral keys active. Each process can be stateless and segregated from the other active instances of the process. The boundaries for each instance are dependent on system requirements, but could be bounded at 100 namespaces key decryptions, 100 million namespace key decryptions, or more, depending on the size of the content management system and equipment used to implement each instance of the tertiary level key encryption process.

According to some examples, the method includes storing the NEK encrypted with the ephemeral key at block 360. After encrypting the NEK with the ephemeral key, the NEK can be stored in the NEK cache 270. The NEK is encrypted with the ephemeral key as it is written to the NEK cache 270, thereby securing the NEK when stored. This encryption is needed for multiple reasons, including that in some examples the NEK cache 270 is a cache accessible by multiple programs and processes and that in some further examples the NEK cache 270 is a distributed cache that is accessible by multiple programs and processes, including each instance of the tertiary level encryption key process. Further, the NEK encrypted by the ephemeral key is stored with the key identification (ID) of the ephemeral key used to encrypt the namespace key.

According to some examples, the ephemeral key is stored at the third-party key management system at block 370. For example, the object storage service 116 of FIG. 2, can also send the ephemeral key used to encrypt the namespace key for storage at the third-party key management service 260. Because the ephemeral key ID is stored with the namespace encryption key in the NEK cache 270 and thereby accessible by multiple processes and programs, using the third-party key management service 260 to store the ephemeral key provides increased security while providing access to all ephemeral keys to every instance of the tertiary key management scheme. Storing the ephemeral keys at each instance of the decryption process significantly reduces the number of requests to the third-party key management service 260. As detailed below, because each instance of the tertiary level encryption key scheme would be able to build a library of ephemeral keys, one from each instance, thereby allowing for decryption using stored ephemeral keys and not requiring a request to the third-party key management service for every NEK decryption. Each instance would only have to request a required ephemeral key a single time from the third-party key management service 260, and then store the required ephemeral key locally. Furthermore, because the NEK cache 270 can be a distributed cache, storing the ephemeral key at the third-party key management service 260 also provides access to all ephemeral keys for each instance of the tertiary key management scheme through access to NEK cache 270.

According to some examples, the encrypted namespace encryption key and the key ID for the ephemeral key used to encrypt the NEK are received by content management system and stored at the NEK cache at block 380. For example, the third-party key management service 260 can send the key ID for the ephemeral key used to encrypt the namespace key to content management system 110. Content management system 110 can then store the encrypted NEK and the respective ephemeral key ID in NEK cache 270. By storing an encrypted version of the ephemeral key at the third-party key management service 260 along with the key ID, the system is able to provide access to the ephemeral keys to other instances operating the tertiary key management scheme, while maintaining security associated with using the third-party key management service 260.

Figure 4:
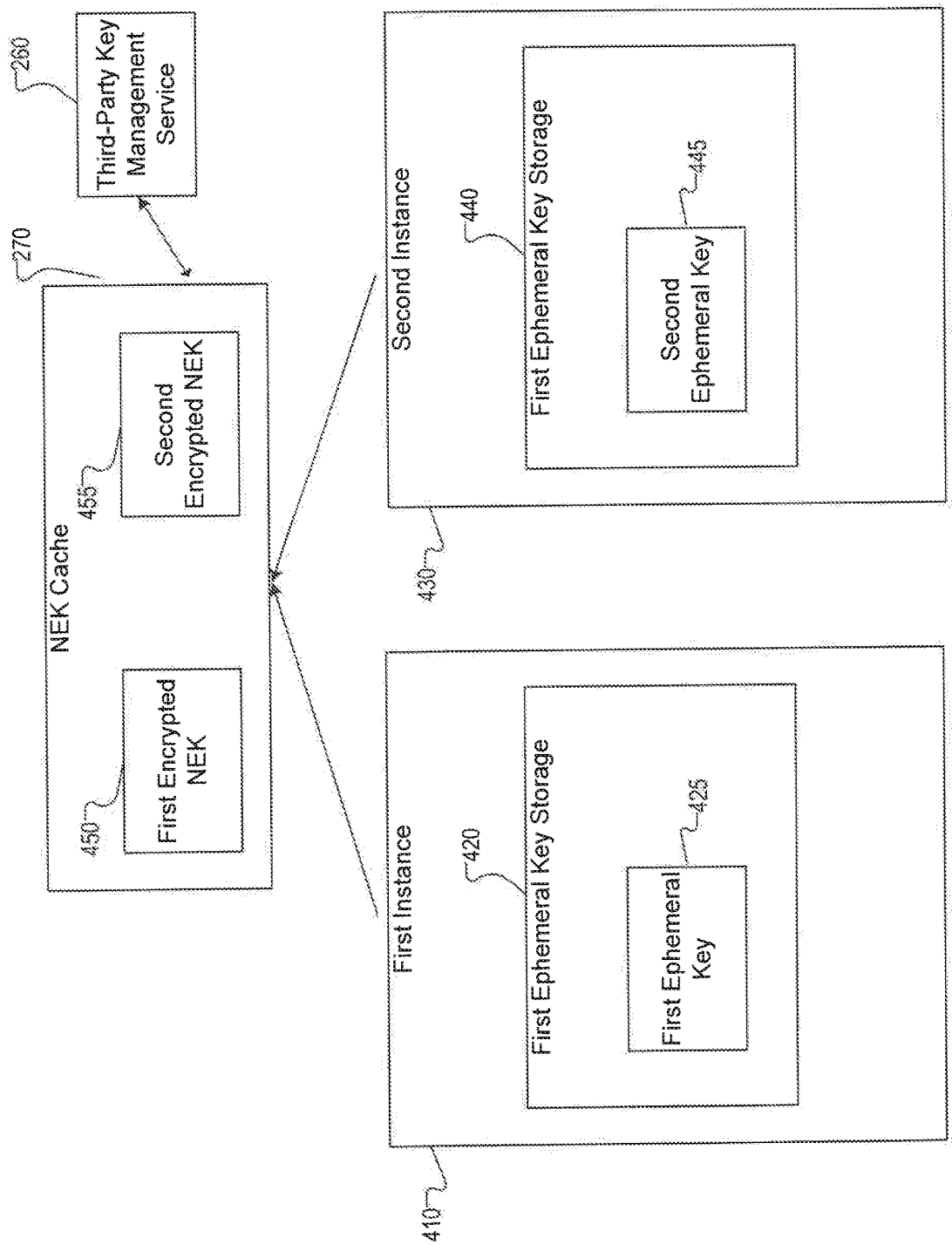
FIG. 4 illustrates an example system configuration for multiple instances of the decryption process using ephemeral keys in accordance with some aspects of the present disclosure.

FIG. 4 illustrates an example system running multiple instances of the tertiary-level encryption scheme in accordance with some aspects of the present disclosure. In one example of using the system of FIG. 4, object storage service 116 has started two separate instances of the tertiary-level encryption scheme, first instance 410 and second instance 430. Initially, the object storage service 116 will determine, based on the number of namespace keys utilizing the tertiary-level encryption scheme that two instances of the tertiary-level encryption scheme are needed. As an example, if each instance is supposed to support one million namespace key decryption processes, then after first instance 410 is supporting one million namespace key decryption processes, the next request to decrypt a namespace key will cause the object storage service 116 to initiate a second instance of the tertiary-level encryption scheme, second instance 430.

Each instance of the tertiary-level encryption scheme has its own ephemeral key generated by the third-party key management service 260 when the instance of the tertiary-level encryption scheme is started. The ephemeral keys for each instance are stored in the ephemeral key storage for that tertiary-level encryption scheme. For example, when first instance 410 is started by the object storage service 116, a first ephemeral key 425 is generated by the third-party key management service 260 and stored in the first ephemeral key storage 420. Similarly, when object storage service 116 starts second instance 430 of the tertiary-level encryption scheme, a second ephemeral key 445 is generated by the third-party key management service 260 and stored in the second ephemeral key storage 440. The first and second ephemeral key storage locations can be local memory used by each instance of the tertiary-level encryption scheme.

Once the first ephemeral key 425 is generated and stored in first ephemeral key storage 420, it can be used to encrypt a plaintext namespace key returned from the third-party key management service 260. For example, first instance 410, can encrypt a namespace encryption key with the first ephemeral key 425, and then send the first encrypted namespace encryption key (NEK) 450 to the NEK cache 270, where the first encrypted NEK 450 can be stored. Because the first encrypted NEK 450 is stored in NEK cache 270, which is accessible by each instance of the tertiary key management scheme, the first encrypted NEK 450 is also accessible by each instance of the tertiary level encryption key scheme, e.g., second instance 430. Furthermore, first encrypted NEK 450 is stored along with the key identification (ID) of the ephemeral key used to encrypt the first encrypted NEK 450, so that each instance of the tertiary level encryption scheme can determine which ephemeral key is used to encrypt encrypted NEK 450. Accordingly, each instance of the tertiary key management scheme is able to decrypt an encrypted NEK, either with its own ephemeral key or through access to the ephemeral key ID and the third-party key management service 260.

In one example, when second instance 430 receives a request to decrypt a namespace encryption key, it first checks to see if the namespace encryption key is present in the NEK cache 270. If it is not present, it goes through the process of requesting the third-party key management service 260 decrypt the NEK and receiving the plaintext NEK from the third-party key management service 260. If it is present in NEK cache 270, then it determines if the namespace encryption key was encrypted using the second ephemeral key 445 or if it was encrypted using the ephemeral key of a different process, e.g., the first ephemeral key 425 of the first instance 410. If it is determined that the second ephemeral key 445 was used to encrypt the requested NEK, then instance two can use its second ephemeral key 445 to decrypt the NEK, provide it to the object storage service 116 which can use the requested NEK in the tertiary level encryption scheme.

However, if the second instance 430 determines that the requested NEK was encrypted by a different ephemeral key, e.g., first ephemeral key 425, then the second instance 430 will need to access the first ephemeral key from the third-party key management service 260. Because the ephemeral key encrypted NEK 450 is stored with a key ID of the ephemeral encryption key used to encrypted NEK 450, the second instance is able to send this key ID to the third-party key management service 260 which can identify the ephemeral key needed from to decrypt the requested encrypted NEK 450. In another example, the second instance 430 is able to identify the ephemeral key needed based on the key ID, and request that ephemeral key from the third-party key management service 260.

The second instance will then request the third-party key management service 260 provide the required ephemeral encryption key based on the key ID stored with the encrypted NEK 450. In this example, because there are only two instances of the tertiary level encryption key scheme, the third-party key management service 260 would identify, based on the key ID, the first ephemeral key 425 and send it to the second instance 430. The second instance would then receive the first ephemeral key 425 from the third-party key management service and store the first ephemeral key 425 in the second ephemeral key storage 440. By storing the first ephemeral key 425 in the second ephemeral key storage 440, the second instance 430 would be able to decrypt all future requested NEKs that are encrypted using the first ephemeral key 425 and the second ephemeral key 445. While this is an example using two instances of the tertiary level key management scheme, this process is not limited to two instances and can have as many instances as needed by the volume of decryption needed, and the ephemeral key libraries would expand to include each ephemeral key for each process. As a further example, if there are one hundred instances of the tertiary level key management scheme running, then, over time, each instance would be able to map one hundred ephemeral keys to each respective instance of the process, thereby providing the ability for any instance of the process to decrypt any namespace key encrypted by an ephemeral key and stored in the NEK cache 270.

Figure 5:
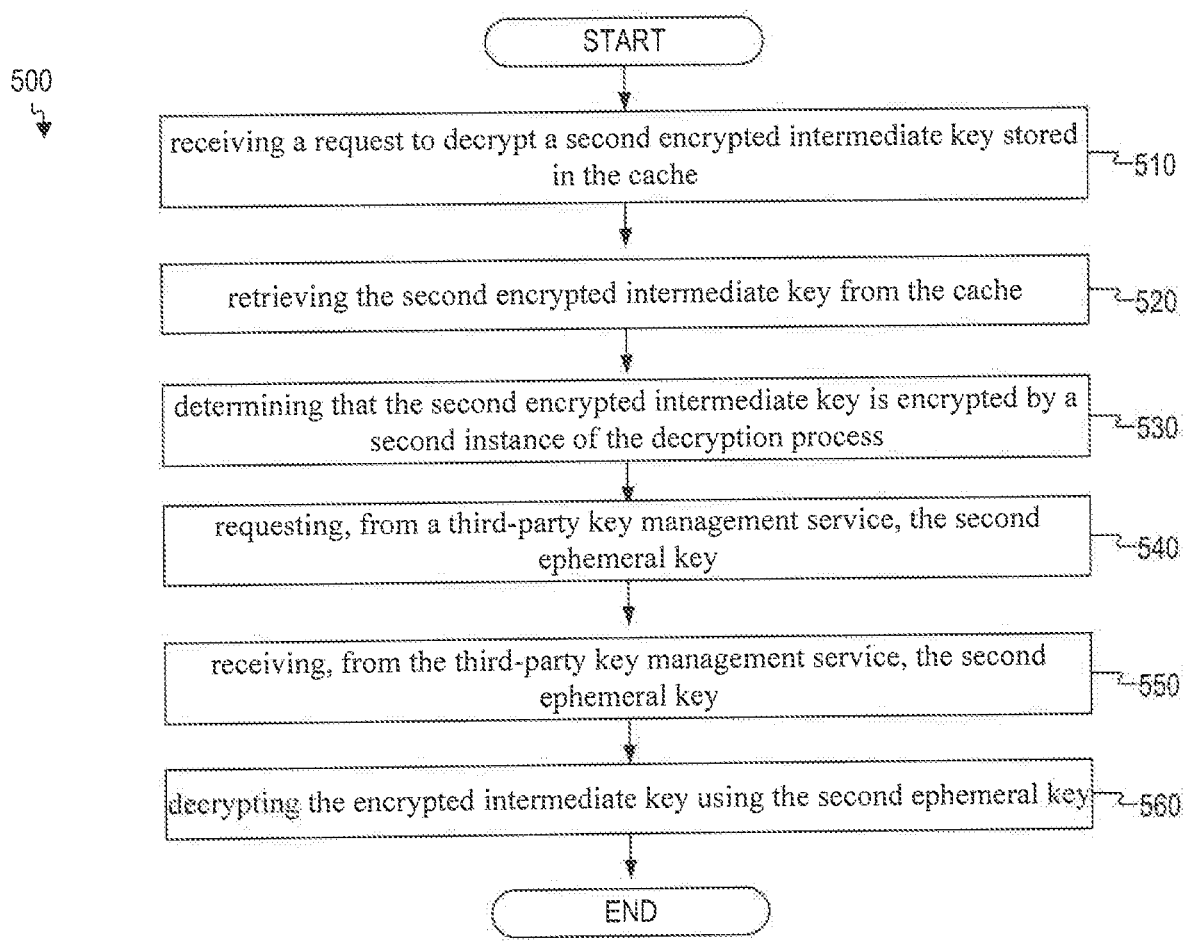
FIG. 5 is a flow chart showing an example method for accessing an ephemeral key used by a different instance of the decryption process from a key management service in accordance with some aspects of the present disclosure.

FIG. 5 illustrates an example method 500 for a first instance of a decryption process decrypting an intermediate level key that is encrypted by an ephemeral key of a different instance of the decryption process. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

One advantage of using a distributed cache in the decryption process is that it allows for each instance of the decryption process to map all ephemeral keys for all the namespace encryption keys used by all other instances of the decryption process. By using a distributed cache that is shared amongst the various instances of the decryption process, the system is able to reduce the number of requests made to a KMS by several orders of magnitude. In one example, rather than having to make hundreds of thousands of requests per minute, using ephemeral keys allows the system to make thousands of requests per day. Using ephemeral keys allows for a drastic reduction in costs while maintaining the security of the namespace encryption keys.

According to some examples, the method includes receiving a request to decrypt a second encrypted intermediate key stored in the cache at step 510. For example, first instance 410 of FIG. 4 can receive a request from the object storage service 116 of FIG. 2 to decrypt a namespace encryption key. The namespace encryption keys stored in the NEK cache 270 of FIG. 2 are encrypted with ephemeral encryption keys. The ephemeral encryption keys are stored with the encrypted namespace encryption keys in the NEK cache 270.

According to some examples, the method includes, retrieving the second encrypted intermediate key from the cache at step 520. For example, the first instance 410 of FIG. 4, can retrieve a second encrypted namespace encryption key 455 from the NEK cache 270. The second encrypted NEK 455 is encrypted with an ephemeral key and the key ID of the ephemeral key is stored along with the second encrypted NEK 455.

According to some examples, the method includes determining that the second encrypted intermediate key is encrypted by a second instance of the decryption process at step 530. For example, the first instance 410 of FIG. 4 receives the second encrypted NEK 455 from the NEK cache 270 along with the key ID. The first instance 410 of the decryption process then analyzes the key ID and determines if the second encrypted NEK 455 is encrypted with an ephemeral key stored in first ephemeral key storage 420 or if the first instance 410 of the decryption process does not yet have access to the ephemeral key used to encrypt second encrypted NEK 455. If the first instance 410 has the ephemeral key stored at first ephemeral key storage 420, (e.g., first ephemeral key 425), then the system uses the first ephemeral key 425 from first ephemeral key storage 420 to decrypt the second encrypted NEK 455, which can then be provided to object storage service 116 for further use in the tertiary level encryption scheme to provide access to objects. However, if the first instance 410 determines that the ephemeral key used to encrypt second encrypted NEK 455 is not available at first ephemeral key storage 420, then it must request the appropriate ephemeral key from the third-party key management service 260 of FIG. 2.

According to some examples, the method includes, requesting, from a third-party key management service, the second ephemeral key at step 540. For example, after the first instance 410 of the decryption process of FIG. 4 determines, based on the key ID of the ephemeral key used to encrypt the second encrypted NEK 455, that the ephemeral key is not stored in first ephemeral key storage 420, it must request the ephemeral key from third-party key management service 260 in FIG. 2. Because the first instance 410 can send the key ID to the third-party key management service 260, the third-party key management service 260 is able to determine the identity of the requested key and provide the appropriate ephemeral key to the first instance 410 of the decryption process.

Because the NEK cache 270 of FIG. 2 can be a distributed cache, every instance of the decryption process has access to NEK cache 270. So, when an NEK is encrypted with the second ephemeral key 445 of FIG. 4, which is generated for the second instance 430 of the decryption process, the NEK encrypted with second ephemeral key 445 is stored in the NEK cache 270 along with the key ID of second ephemeral key 445. Storing the encrypted NEK with the key ID allows a different instance of the decryption process to access the second ephemeral key 445 via the third-party key management service 260. Furthermore, if the second ephemeral key 445 is identified as the ephemeral key needed to decrypt the second encrypted NEK 455, for example, at the first instance 410, the first instance 410 can receive and then store the second ephemeral key 445 in first ephemeral key storage 420.

According to some examples, the method includes, receiving, from the third-party key management service, the second ephemeral key at step 550. For example, the first instance 410 of the decryption process of FIG. 4 receives the requested ephemeral key from the third-party key management service 260 of FIG. 2, and stores it in first ephemeral key storage 420. By storing it locally in memory, first instance 410 is able to rely on each of the locally stored ephemeral keys to decrypt an encrypted NEK requested by object storage service 116. Local storage in first ephemeral key storage 420 allows the system to substantially reduce the number of requests to the third-party key management service 260, as each instance of the decryption process will build up a library of all used ephemeral keys over time, thereby allowing each instance of the process to decrypt any NEK encrypted with an ephemeral key.

According to some examples, the method includes, decrypting the encrypted intermediate key using the second ephemeral key at step 560. For example, the first instance 410 of FIG. 4 can decrypt the second encrypted NEK 455 using second ephemeral key 445 and provide a plaintext version of the second NEK to object storage service 116 of FIG. 2. Then object storage service 116 is able to use the plaintext second NEK within the tertiary level encryption scheme to provide objects requested by client device 150 of FIG. 2.

Figure 6:
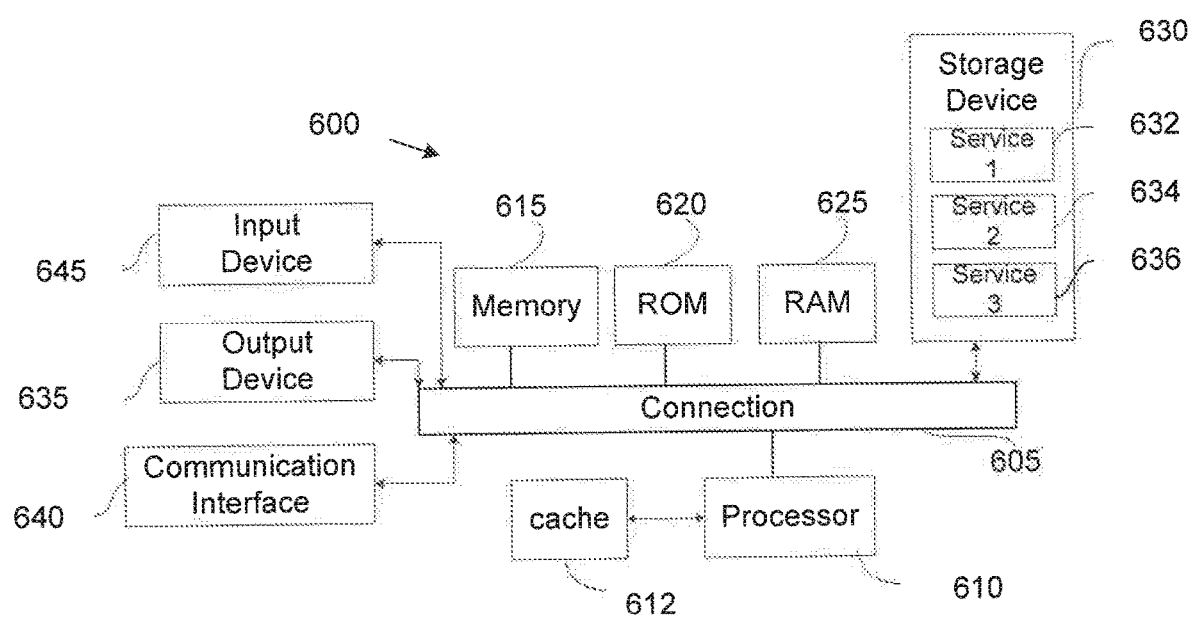
FIG. 6 shows an example of a system for implementing certain aspects of the present technology.

FIG. 6 shows an example of computing system 600, which can be for example any computing device making up the content management system or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., and when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1. A method comprising: receiving, at a first instance of a decryption process, a request to decrypt an encrypted intermediate key; determining, based on the encrypted intermediate key, that the encrypted intermediate key is encrypted with a local ephemeral key stored in a local memory at the first instance of a decryption process; using the local ephemeral key to decrypt the encrypted intermediate key; and after decrypting the encrypted intermediate key, providing a decrypted intermediate key from the first instance of the decryption process to a content management system.

Aspect 2. The method of Aspect 1, wherein the local ephemeral key is generated at a third-party key management service when the first instance of a decryption process is started.

Aspect 3. The method of any of Aspects 1 to 2, further comprising: receiving a copy of the local ephemeral key from the third-party key management service; and storing the copy of the local ephemeral key in the local memory at the first instance of the decryption process.

Aspect 4. The method of any of Aspects 1 to 3 further comprising, storing, by the content management system, the encrypted intermediate key in a cache, wherein the cache is a distributed cache available to a second instance of the decryption process.

Aspect 5. The method of any of Aspects 1 to 4, further comprising: at the first instance of the decryption process, to decrypt a second encrypted intermediate key stored in the cache; retrieve the second encrypted intermediate key from the cache; determining that the second encrypted intermediate key is encrypted by a second instance of the decryption process; requesting, from a third-party key management service, the second ephemeral key; receiving, from the third-party key management service, the second ephemeral key; and decrypting the encrypted intermediate key using the second ephemeral key.

Aspect 6. The method of any of Aspects 1 to 5, further comprising; storing, at the first instance of the decryption process, the second ephemeral key.

Aspect 7. The method of any of Aspects 1 to 6, wherein determining that the second encrypted intermediate key is encrypted by a second instance of the decryption process is based on a key ID associated with the second ephemeral key used to encrypt the second encrypted intermediate key.

Aspect 8. The method of any of Aspects 1 to 7, wherein the first instance of the decryption process retrieves a key ID associated with a second ephemeral key used to encrypt the second encrypted intermediate key when it retrieves the second encrypted intermediate key from the cache.

What is claimed is:

1. A method comprising:
   receiving, at a first instance of a decryption process, a request to decrypt an encrypted intermediate key, wherein the encrypted intermediate key is associated with a namespace at a content management system;
   determining, based on the encrypted intermediate key, that the encrypted intermediate key is encrypted with a local ephemeral key, wherein the local ephemeral key is generated at a third-party key management service when the first instance of the decryption process is started
   receiving a copy of the local ephemeral key from the third-party key management service;
   storing the copy of the local ephemeral key in a local memory at the first instance of the decryption process;
   using the local ephemeral key to decrypt the encrypted intermediate key; and
   after decrypting the encrypted intermediate key, providing a decrypted intermediate key from the first instance of the decryption process to the content management system, wherein the decrypted intermediate key is configured to decrypt block level encryption keys.

2. The method of claim 1, further comprising:
   storing, by the content management system, the encrypted intermediate key in a cache.

3. The method of claim 2, further comprising:
   receiving a request, at the first instance of the decryption process, to decrypt a second encrypted intermediate key stored in the cache;
   retrieving the second encrypted intermediate key from the cache;
   determining that the second encrypted intermediate key is encrypted by a second instance of the decryption process;
   requesting, from a third-party key management service, a second ephemeral key;
   receiving, from the third-party key management service, the second ephemeral key; and
   decrypting the second encrypted intermediate key using the second ephemeral key.

4. The method of claim 3, further comprising:
   storing, at the first instance of the decryption process, the second ephemeral key.

5. The method of claim 3, wherein determining that the second encrypted intermediate key is encrypted by a second instance of the decryption process is based on a key ID associated with the second ephemeral key used to encrypt the second encrypted intermediate key.

6. The method of claim 5, wherein the first instance of the decryption process retrieves a key ID associated with a second ephemeral key used to encrypt the second encrypted intermediate key when it retrieves the second encrypted intermediate key from the cache.

7. A content management system comprising:
one or more processors; and
a non-transitory computer-readable medium storing instructions that, when executed by the one or more processors, cause the one or more processors to:
receive, at a first instance of a decryption process, a request to decrypt an encrypted intermediate key, wherein the encrypted intermediate key is associated with a namespace at a content management system and wherein the encrypted intermediate key is stored in a cache;
determine, based on the encrypted intermediate key, that the encrypted intermediate key is encrypted with a local ephemeral key stored in a local memory at the first instance of the decryption process, wherein the local ephemeral key is generated at a third-party key management service when the first instance of a decryption process is started;
receive a copy of the local ephemeral key from the third-party key management service; and
store the copy of the local ephemeral key in the local memory at the first instance of the decryption process;
use the local ephemeral key to decrypt the encrypted intermediate key; and
after decrypting the encrypted intermediate key, provide a decrypted intermediate key from the first instance of the decryption process to the content management system, wherein the decrypted intermediate key is configured to decrypt block level encryption keys.

8. The content management system of claim 7, storing instructions that, when executed by the one or more processors, further cause the one or more processors to: storing, by the content management system, the encrypted intermediate key in a cache.

9. The content management system of claim 8, storing instructions that, when executed by the one or more processors, further cause the one or more processors to:
receive a request, at the first instance of the decryption process, to decrypt a second encrypted intermediate key stored in the cache;
retrieve the second encrypted intermediate key from the cache;
determine that the second encrypted intermediate key is encrypted by a second instance of the decryption process;
request, from a third-party key management service, a second ephemeral key;
receive, from the third-party key management service, the second ephemeral key; and
decrypt the second encrypted intermediate key using the second ephemeral key.

10. The content management system of claim 9, storing instructions that, when executed by the one or more processors, further cause the one or more processors to:
store, at the first instance of the decryption process, the second ephemeral key.

11. The content management system of claim 9, wherein determining that the second encrypted intermediate key is encrypted by a second instance of the decryption process is based on a key ID associated with the second ephemeral key used to encrypt the second encrypted intermediate key.

12. The content management system of claim 11, wherein the first instance of the decryption process retrieves a key ID associated with a second ephemeral key used to encrypt the second encrypted intermediate key when it retrieves the second encrypted intermediate key from the cache.

13. A non-transitory computer-readable medium storing instructions that, when executed by one or more processors, cause the one or more processors to:
receive at a first instance of a decryption process, a request to decrypt an encrypted intermediate key, wherein the encrypted intermediate key is associated with a namespace at a content management system and wherein the encrypted intermediate key is stored in a cache;
determine, based on the encrypted intermediate key, that the encrypted intermediate key is encrypted with a local ephemeral key stored in a local memory at the first instance of a decryption process, wherein the local ephemeral key is generated at a third-party key management service when the first instance of the decryption process is started;
receiving a copy of the local ephemeral key from the third-party key management service; and
storing the copy of the local ephemeral key in the local memory at the first instance of the decryption process;
use the local ephemeral key to decrypt the encrypted intermediate key; and
after decrypting the encrypted intermediate key, providing a decrypted intermediate key from the first instance of the decryption process to the content management system, wherein the decrypted intermediate key is configured to decrypt block level encryption keys.

14. The non-transitory computer-readable medium of claim 13, wherein the local ephemeral key is generated at a third-party key management service when the first instance of a decryption process is started.

15. The non-transitory computer-readable medium of claim 13, wherein storing instructions that, when executed by the one or more processors, cause the one or more processors to:
store, by the content management system, the encrypted intermediate key in a cache.

16. The non-transitory computer-readable medium of claim 15, wherein storing instructions that, when executed by the one or more processors, cause the one or more processors to:
receive a request, at the first instance of the decryption process, to decrypt a second encrypted intermediate key stored in the cache;
retrieve the second encrypted intermediate key from the cache;
determine that the second encrypted intermediate key is encrypted by a second instance of the decryption process;
request, from a third-party key management service, a second ephemeral key;
receive, from the third-party key management service, the second ephemeral key; and
decrypt the second encrypted intermediate key using the second ephemeral key.

17. The method of claim 2, wherein the cache is a distributed cache available to a second instance of the decryption process.

18. The method of claim 1, further comprising:
sharing the encrypted intermediate key with a second namespace, wherein the encrypted intermediate key provides access to an object at the second namespace.

19. The content management system of claim 7, wherein the cache is a distributed cache available to a second instance of the decryption process.

20. The non-transitory computer-readable medium of claim 13, wherein the cache is a distributed cache available to a second instance of the decryption process.

* * * * *